(12) United States Patent
Boys

(10) Patent No.: US 9,406,436 B2
(45) Date of Patent: Aug. 2, 2016

(54) NON-FERRITE STRUCTURES FOR INDUCTIVE POWER TRANSFER

(71) Applicant: Auckland UniServices Limited, Auckland (NZ)

(72) Inventor: John Talbot Boys, Albany (NZ)

(73) Assignee: Auckland UniServices Limited, Auckland (NZ)

( * ) Notice: Subject to any disclaimer, the term of this patent is extended or adjusted under 35 U.S.C. 154(b) by 1 day.

(21) Appl. No.: 14/354,705

(22) PCT Filed: Oct. 29, 2012

(86) PCT No.: PCT/NZ2012/000198
§ 371 (c)(1),
(2) Date: Apr. 28, 2014

(87) PCT Pub. No.: WO2013/062427
PCT Pub. Date: May 2, 2013

(65) Prior Publication Data
US 2014/0284159 A1    Sep. 25, 2014

(30) Foreign Application Priority Data

Oct. 28, 2011 (NZ) ..................................... 596080
Dec. 16, 2011 (NZ) ..................................... 597166
Sep. 6, 2012 (NZ) ..................................... 602304

(51) Int. Cl.
*H01F 38/14* (2006.01)
*H02J 5/00* (2016.01)
*H01F 27/38* (2006.01)

(52) U.S. Cl.
CPC ................. *H01F 38/14* (2013.01); *H01F 27/38* (2013.01); *H02J 5/005* (2013.01)

(58) Field of Classification Search
CPC ....... B60L 13/00; B60L 13/006; B60L 13/03; B60L 13/04; B60L 13/10
USPC .................................. 191/2–4, 10, 22 R, 22 C
See application file for complete search history.

(56) References Cited

U.S. PATENT DOCUMENTS 4,836,344 A * 6/1989 Bolger .................... B60L 5/005
                                                             191/10
2007/0131505 A1    6/2007 Kim
(Continued)

FOREIGN PATENT DOCUMENTS

CN    201813221    4/2011
DE   102006053681   5/2008
(Continued)

OTHER PUBLICATIONS

New Zealand Application No. 628198, First Examination Report dated Aug. 15, 2014, 3 pgs.
(Continued)

*Primary Examiner* — R. J. McCarry, Jr.
(74) *Attorney, Agent, or Firm* — Schwegman Lundber & Woessner, P.A.

(57) ABSTRACT

An inductive power transfer apparatus suitable for producing a magnetic field for inductive power transfer is disclosed. The apparatus has three or more coils arranged such that when energized with a power source, magnetic fields produced by each coil augment each other on a first surface and substantially weaken each other on a second surface. The first and second surfaces have an obverse relationship to each other. Also disclosed is a roadway inductive power transfer module suitable for producing a magnetic field for inductive power transfer to a vehicle using the roadway, and an Inductive power transfer apparatus suitable for receiving a magnetic field for inductive power transfer.

32 Claims, 12 Drawing Sheets

(56) References Cited

U.S. PATENT DOCUMENTS

| | | |
|---|---|---|
| 2008/0116847 A1 | 5/2008 | Loke et al. |
| 2011/0089768 A1 | 4/2011 | Byrne et al. |

FOREIGN PATENT DOCUMENTS

| | | |
|---|---|---|
| EP | 2372838 | 10/2011 |
| GB | 2388715 | 11/2003 |
| TW | I271911 | 1/2007 |
| WO | WO-2009/027674 A1 | 3/2009 |
| WO | WO-2010/090539 A1 | 8/2010 |
| WO | WO-2011/016736 A2 | 2/2011 |
| WO | WO-2011/016737 A1 | 2/2011 |

OTHER PUBLICATIONS

International Application No. PCT/NZ2012/000198, International Preliminary Report on Patentability mailed Apr. 29, 2014, 8 pgs.

International Application No. PCT/NZ2012/000198, International Search Report mailed Jan. 29, 2013, 6 pgs.

International Application No. PCT/NZ2012/000198, Written Opinion mailed Jan. 29, 2013, 7 pgs.

\* cited by examiner 1002  1001  1003

1002  1001  1003

1002    1002        1003

NON-FERRITE STRUCTURES FOR INDUCTIVE POWER TRANSFER

PRIORITY APPLICATIONS

This application is a U.S. National Stage Filing under 35 U.S.C. 371 from International Application No. PCT/NZ2012/000198, filed on 29 Oct. 2012, and published as WO 2013/062427 A1 on 2 May 2013, which claims the benefit under 35 U.S.C. 119 to New Zealand Application No. 596080, filed on 28 Oct. 2011 and to New Zealand Application No. 597166, filed on 16 Dec. 2011 and to New Zealand Application No. 602304, filed on 6 Sep. 2012; which applications and publication are incorporated herein by reference in their entirety.

FIELD OF THE INVENTION

The invention relates to apparatus for producing magnetic flux from a source of electrical energy and/or receiving magnetic flux to provide a source of electrical energy. In one application the invention provides an inductive power transfer device which may be used as a magnetic flux generator or receiver for use in roadway inductive power transfer (IPT) applications.

BACKGROUND

IT systems are discussed generally and in particular in connection with a powered roadway application in international patent publication WO 2011/016736. In the system described in that publication, a pad to pad IPT transmission method is used. The pads include ferrite in both the transmitter and receiver pad in order to keep the size of those devices as small as possible whilst still transferring the required power. Specific construction of appropriate pads for an IPT roadway application is described in international patent publication WO 2010/090539 which includes an IPT magnetic flux transmitter or receiver, which is referred to in that document (and will also be referred to in this document) as a Double D pad design. The Double D pad design has excellent performance, and the pad arrangements constructed according to the design can be made less than 25-30 mm thick so that the receiving pad takes up very little space under the vehicle. Similarly, a transmitter pad according to the Double D design can be made sufficiently thin that it can be placed on or in the floor of a garage, for example for charging purposes.

The Double D pad design and other pad structures, typically use ferrite in order to produce the required flux. Ferrite has disadvantages of being brittle and expensive. In particular, in a vehicle and roading environment, ferrite is easily damaged. There is a need for developing an IPT flux transmission and/or reception apparatus which can tolerate vehicles such as 40-50 tonne trucks driving over them continually when placed in a roadway environment.

Any discussion of the prior art throughout the specification should in no way be considered as an admission that such prior art is widely known or forms part of common general knowledge in the field.

OBJECTS OF THE INVENTION

It is an object of the present invention to provide a roadway inductive power transfer module which overcomes one or more disadvantages of the existing constructions. Alternatively, it is an object of the present invention to at least provide the public with a useful choice.

Further objects of the invention will become apparent from the following description.

SUMMARY OF THE INVENTION

In one aspect the invention provides inductive power transfer apparatus suitable for producing a magnetic field for inductive power transfer, the apparatus comprising:
a first surface and a second surface in obverse relationship to each other;
three or more coils being arranged such that when energised with a power source magnetic fields produced by each coil augment each other on the first surface and substantially weaken each other on the second surface.

Preferably the coils comprise
a central coil;
a first end coil adjacent to one end of the central coil;
a second end coil adjacent to the other end of the central coil.

Preferably the coils comprise solenoidal coils.

Preferably the central coil produces an mmf in a direction nominally parallel to the first side, and the end coils produce mmfs in a direction nominally perpendicular to the first side.

Preferably the coils are arranged such that in use the fields produced by the end coils are in opposite directions such that a field is produced having an arched flux pattern beyond the first side.

Preferably the combined ampere-turns per meter of the end coils is less than the ampere-turns per meter of the central coil.

Preferably the end coils have substantially the same ampere-turns, and the central coil has at least twice the ampere-turns of one of the end coils.

Preferably the length of the end coils in a direction perpendicular to the first surface is substantially the same, and the length of the central coil in a direction parallel to the first side is at least approximately twice that of each end coil.

Preferably the ends coils share one or more turns with the central coil.

Preferably the central coil has a greater length nearer the second side than the first side.

Preferably the end coils have a greater circumference nearer the first side than the second side.

Preferably a third end coil is provided adjacent to the first end coil, and a fourth end coil is provided adjacent to the second end coil.

Preferably the third and fourth end coils are arranged to produce a magnetic field in a direction opposite to that of the first coil.

Preferably the third and fourth end coils have less than or equal to half the ampere-turns of the first and second end coils.

Preferably the distance between the first and second surfaces is defined by a dimension of the central coil. For example the thickness of the central coil.

Preferably the useful magnetic field produced extends beyond the first side to a distance approximately equal to the distance between the first and second surfaces.

Preferably the useful magnetic field produced extends beyond the first side to a distance approximately equal to the length of the first and second end coils in a direction perpendicular to the first surface.

Preferably the B field at a given distance beyond the apparatus from the first surface is greater than the B field at the same distance beyond the apparatus from the second surface.

Preferably the given distance is substantially the same as the distance between the first and second surfaces.

Preferably the coils are substantially surrounded by a substrate material.

Preferably the coils are embedded in a substrate material.

Preferably the substrate material comprises a non-magnetic material.

Preferably the coils comprise one winding.

In another aspect the invention provides inductive power transfer apparatus suitable for providing a magnetic field for inductive power transfer, the apparatus comprising:
a pair of first coil-sections separated about a first axis and arranged to produce a magnetic field in a direction nominally parallel to the first axis;
one or more second coil-sections arranged to produce a magnetic field extending perpendicular to the first axis and aligned relative to the first coil-sections such that the fields augment to provide a magnetic field at one end of the axis and cancel each other at the other end of the axis.

In another aspect the invention provides a roadway inductive power transfer module suitable for producing a magnetic field for inductive power transfer to a vehicle using the roadway, the module comprising a road surface side and a road foundation side which is substantially opposite to the road surface side, a central coil, a first end coil adjacent to one end of the central coil and a second end coil adjacent to the other end of the central coil, the coils being arranged such that when energised with a power source magnetic fields produced by each coil augment each other on the road surface side and substantially cancel each other on the road foundation side.

Preferably the coils are surrounded by concrete.

Preferably the coils comprise one winding.

In another aspect the invention provides a roadway comprising a plurality of roadway inductive power transfer modules as claimed in any one of claims 24 to 26.

In another aspect the invention provides inductive power transfer apparatus suitable for receiving a magnetic field for inductive power transfer, the apparatus comprising:
a first surface and a second surface in obverse relationship to each other;
three or more coils being arranged such that when energised with a power source magnetic fields produced by each coil augment each other on the first surface and substantially weaken each other on the second surface.

In another aspect the invention provides inductive power transfer apparatus suitable for receiving a magnetic field for inductive power transfer, the apparatus comprising:
a first surface and a second surface in obverse relationship to each other;
a central coil;
a first end coil adjacent to one end of the central coil;
a second end coil adjacent to the other end of the central coil.

Preferably the coils comprise solenoidal coils.

In another aspect of the present invention, there is provided a roadway inductive power transfer module comprising essentially a physically strong non-magnetic material rather than a magnetically permeable material, the module having a first side adapted for provision at a surface of a roadway at which a magnetic flux is generated in use, and a second side which is opposite to the first side, the apparatus comprising a plurality of adjacent coils arranged so that when energised the coils provide an augmented magnetic field on the first side and a substantially cancelled magnetic field on the second side.

Preferably the coils are wound with one continuous piece of litz wire.

Preferably the non-magnetic material comprises one or more of: concrete; masonry; ceramic.

Preferably the apparatus is reinforced using one of more of: alumina, silica, fibre glass, kevlar, or carbon fibre.

Preferably each coil is arranged to generate a magneto motive force (mmf) in a selected direction to produce a required magnetic flux pattern.

Preferably the plurality of coils comprise a central coil arranged to provide an mmf in a first direction which is parallel to the first and second sides, two end coils at either end of the apparatus, both the end coils providing an mmf in a direction which is opposite to the first direction, a first intermediate coil being located between the central coil and an end coil, a second intermediate coil being located between the central coil and the other end coil, the first intermediate coil providing an mmf in a direction toward the first side of the apparatus and the second intermediate coil providing an mmf in a direction toward the second side of the pad.

In one embodiment, the end coils each produce approximately half the mmf of the central coil.

In another embodiment, the coils: each produce substantially the same mmf.

Preferably the coils are substantially solenoidal.

Preferably the coils are substantially prismatic in form.

Preferably the coils each take the form of a substantially square or rectangular prism.

Preferably the coils are substantially square or rectangular in cross section in a plane orthogonal to the first and second sides; in one embodiment the square or rectangular cross section is substantially the same for each of the coils.

In another embodiment the end coils are made to produce substantially less mmf than the other coils by reducing the number of turns in them. The mmf in the end coils may be reduced to zero. In another aspect of the present invention, there is provided a roadway unit comprising a non-magnetic material, the unit having a first side adapted for provision at a surface of a roadway at which a magnetic flux is generated in use, and a second side which is opposite to the first side, the apparatus comprising a plurality of conductor receiving pathways therein, the pathways being adapted to receive a conductor so that when provided within the pathways the conductor forms a plurality of adjacent coils arranged such that when energised the coils provide an augmented magnetic field on the first side and a substantially cancelled magnetic field on the second side.

Preferably the conductor receiving pathways comprise, apertures.

Preferably the conductor may be threaded through the apertures.

Preferably a single continuous conductor is used.

Preferably the non-magnetic material comprises one or more of: concrete, masonry; ceramic.

Preferably the apparatus is reinforced using one of more of alumina, silica, fibre glass, or carbon fibre.

Preferably each coil is arranged to generate a magnetomotive force (mmf) in a selected direction to produce a required magnetic flux pattern.

Preferably the plurality of coils comprise a central coil arranged to provide an mmf in a first direction which is parallel to the first and second sides, two end coils at either end of the apparatus, both the end coils providing an mmf in a direction which is opposite to the first direction, a first intermediate coil being located between the central coil and an end coil, a second intermediate coil being located between the central coil and the other end coil, the first intermediate coil providing an mmf in a direction toward the first side of the apparatus and the second intermediate coil providing an mmf in a direction toward the second side of the pad.

In one embodiment, the end coils each produce approximately half the mmf of the central coil.

In another embodiment, the coils each produce substantially the same mmf.

In another embodiment the end coils produce zero mmf.

Preferably the coils are substantially solenoidal.

Preferably the coils are substantially prismatic in form.

Preferably the coils each take the form of a substantially square or rectangular prism.

Preferably the coils are substantially square or rectangular in cross section in a plane orthogonal to the first and second sides; in one embodiment the square or rectangular cross section is substantially the same for each of the coils.

Preferably a single continuous conductor is used to wind all the coils.

In a further aspect of the present invention consists in a method of providing a roadway inductive power transfer module, the method comprising the steps of:
providing a former;
casting a non-magnetic material about the former to form a roadway unit having a first side adapted for provision at a surface of a roadway, and a second side which is opposite to the first side, and the unit having a plurality of conductor receiving pathways therein;
threading a conductor through the pathways so that the conductor forms a plurality of adjacent coils arranged such that when energised the coils provide an augmented magnetic field on the first side and a substantially cancelled magnetic field on the second side.

In a further aspect of the present invention consists in a method of providing a roadway inductive power transfer module, the method comprising the steps of:
providing a conductor arranged to form a plurality of adjacent coils;
casting a non-magnetic material about the coils to form a roadway module having a first side adapted for provision at a surface of a roadway, and a second side which is opposite to the first side, and the coils being arranged such that when energised the coils provide an augmented magnetic field on the first side and a substantially cancelled magnetic field on the second side.

In a further aspect the invention provides an inductive power transfer module comprising a wall having a plurality of conductive paths thereon and conductors extending from the conductive paths, wherein the conductive paths and the conductors provide three or more coils.

Preferably two walls are provided, and the conductors extend between the walls to provide the three or more coils.

Preferably the wall(s) comprise a printed circuit board.

In another aspect the invention provides a wall for an inductive power transfer module, the wall comprising a substrate which carries a plurality of conductive paths.

Preferably the wall comprises a printed circuit board.

In another aspect the invention provides a method of manufacture of an inductive power transfer module, the method including the steps of forming two side walls, providing a plurality of conductive paths on each side wall, and electrically connecting conductors to the conductive paths such that the conductors extend between the side walls and so that a plurality of coils are formed.

Preferably the method further includes the step of surrounding the conductors between the walls with a filler material or a reinforcing material.

In a further aspect, the invention may broadly be said to consist in an IPT system including a roadway module or unit according to any one of the preceding statements.

In a further aspect of the invention there is provided a roadway including a plurality of modules or units according to any one of the preceding statements.

Preferably the roadway comprises one or more of: a car-park; a garage floor; a driveway; a road.

Preferably the roadway is constructed form one or more of: concrete, aggregate; masonry; bitumen.

Preferably the apparatus is reinforced using one of more of: alumina, silica, fibre glass, Kevlar, or carbon fibre.

In a further aspect the invention provides a method of providing a magnetic field for roadway inductive power transfer from a roadway comprising a plurality of flux generating modules. The method comprises sequentially energising each module such that two adjacent modules are energised at any one time.

In some circumstances the strength of a permanent magnet or an electromagnet may be described in terms of its dipole moment (DM). Originally the DM was the pole strength of the magnetic poles in the magnet times the separation between them. The torque produced by a magnet in a magnetic field B is the DM×the field strength B times the sine of the angle between the DM and the field B. This concept is still used with permanent magnets. For electromagnets the DM is the NI of the coil times the area of the coil. The torque calculations are the same—torque=DM×B×sine(theta). In some situations this concept is useful with the present invention.

In another aspect the invention provides apparatus substantially as herein described with reference to any embodiment shown in the accompanying drawings.

In another aspect the invention broadly consists in any novel feature, or any novel combination of features, disclosed herein.

Other aspects of the invention will become apparent form the following description.

DESCRIPTION OF THE DRAWINGS

FIG. 11: is a simulation of the flux pattern as in: FIG. 10 but with a flux collector at a height equal to the thickness of the ground coil;

DESCRIPTION OF ONE OR MORE PREFERRED EMBODIMENTS

The inductive power transfer apparatus described below may be provided in the form of a pad, and for purposes of convenience is referred to in this document as a pad despite being capable of being provided in other forms. These new pads may have no ferrite in them, and in at least one embodiment there is no ferrite at all. In consequence the construction of a pad can be very different from those presently known. The new pads can be made simply using concrete, or another suitably robust non-magnetic material such as plastic, masonry or a ceramic material, and a conductor such as litz wire. The pads, particularly when made from concrete, are suitable for inductive power transfer in roadway applications as they are advantageously very heavy but can be constructed on-site in a simple manufacturing process described herein.

Figure 1:
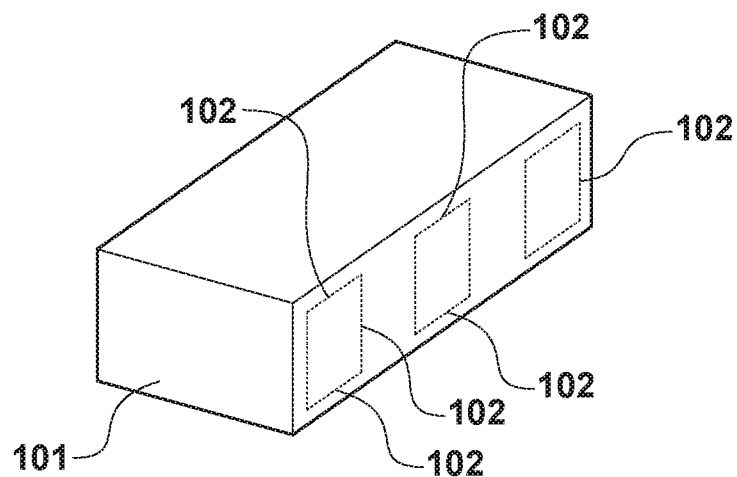
FIG. 1: is a diagrammatic perspective view of a non-wired 5 square roadway unit or module for inductive power transfer.

A drawing of a concrete pad is shown in FIG. 1. It comprises a unit or block 101 of non-magnetic material, such as concrete or a similar material, having a series of conductor receiving pathways in the form of apertures 102 through which a conductor such as litz wire may be threaded as will be described further below. The top surface of the unit 101 is the roadway surface which may be covered with bitumen, and the bottom surface may sit on the roadway foundations. The concrete block 101 may be cast on-site complete with holes 102 for the wire, and the wire is made and finished off-site, transported to the site and threaded into the concrete block 101. The holes 102 are made to a pattern that will generate a magnetic field above the top surface of the concrete block with a weaker or negligible field out the bottom surface of the block. The wire is a litz wire which may be fully terminated before insertion and is preferably wound as one continuous wire. In its manufacture the concrete block can be cast with through dowels where the holes 102 are to be, and the dowels can be removed when the concrete is set. Such removal may be difficult as concrete shrinks on setting and will hold the dowels tightly but alternatively the dowels may be hollow non-magnetic (for example plastic) tubes that do not have to be removed. The concrete may be reinforced but metal cannot be used so it may instead be reinforced with other appropriate materials, for example chopped alumina, or chopped fibreglass or chopped fibre or carbon nano-tubes or Kevlar or other material that is non-magnetic. Alumina is very strong, non-magnetic, and an insulator and is a preferred reinforcing material. The pad is finished by plugging the holes containing the wires with glue—for example a strong epoxy—so that there is no movement possible between the wires and the concrete that they are in.

As an alternative, the wire may be formed into the appropriate winding pattern using one or more formers which may be made of a non-magnetic material such as plastic for example. Then the concrete may be cast around the wire and former(s). This process avoids the need to thread the wire through apertures 102. This process may also occur on-site if required. As part of the construction the top surface of the pad may be finished in some form of epoxycrete which is a mixture of concrete and epoxy and is a very durable surface with excellent wear characteristics for a long lifetime in the roadway. The epoxycrete can be moulded into a cap that covers the top surface and extends down the sides of the pad to create a structure that is strong, and resistant to delaminating. The cap may be 5-10 mm thick. There are a number of proprietary products that are suitable for this task and the choice will likely involve an understanding of local conditions and the availability of components. It should be noted that concrete pads are likely to be very heavy—this is clearly an advantage on a roadway surface as the heavier they are less likely they are to move when a vehicle with a high axle loading is driven over it. For a roadway, concrete is a completely acceptable material world-wide, so a pad made of concrete has unique advantages.

Figure 2:
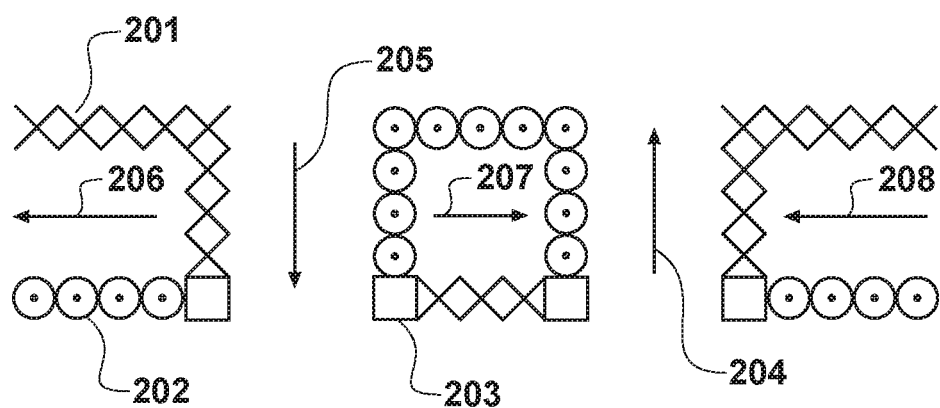
FIG. 2: is a diagrammatic cross section of the unit of FIG. 1 showing a winding pattern for a wire threaded through the apertures 102 of the unit of FIG. 1.

The winding pattern which is clearly shown in FIG. 2 is very different from that used in other magnetic structures for inductive power transfer. For example, in the double D pad there are only wires on one side of the pad and ferrite acts as a magnetic mirror so that the winding appears to be on both sides as far as the flux in the pick-up is concerned. Here in FIGS. 1 and 2 there is no ferrite so wires are on both sides. To tie these sides together extra vertical flux coils are needed—shown clearly in FIG. 2. These are not required with a Double D structure. For convenience the structure shown in FIG. 1 is called a 5-block pick-up. Here these blocks are all square prisms and are all the same size but this is not always the case. The wiring diagram produces a horizontal flux in the first block, a vertical flux in the second block, a horizontal flux in the third block, a vertical flux in the fourth block and a horizontal flux in the fifth block. These blocks, NI generators (i.e. mmf's indicated by arrows), and fluxes, can also be seen very clearly in FIG. 6. Winding these pads is clearly an issue as the weight of the concrete makes moving them quite difficult. Here in this specification the winding process is minimised wherever possible by using small numbers of turns—typically 5-12—so that the windings involve less operations.

A wiring pattern is shown in cross section in FIG. 2 for a 5-block pad. In essence this pattern is the same pattern as that shown on the side of the block 101 in FIG. 1, as the hole pattern. Crosses labelled 201 correspond to currents into the side of the block, carried in wires fed into the holes 102 in FIG. 1. Circles 202 are currents out of the block. Blank squares correspond to situations where the rules are in conflict and the same space should have a cross and a circle simultaneously. In these circumstances these positions are not wired. In other situations 2 wires may be needed to meet the winding rules but in this circumstance a single wire is used to meet both conditions at the same time. Those skilled in the art will appreciate that there are other alternative winding patterns which may be used to achieve the required functionality.

Still referring to FIG. 2, arrows 204 to 208 show the mmfs (being the NI vectors which create and direct the fields created by the coils). The effect of these mmfs in the directions shown is to produce a high arching flux out the top of the block from the up arrow labelled 204 to the down arrow 205. In practice the number of wires used in wiring the block may be much larger than the number shown here so that the blank spots (203) do not have such a significant effect. In the example illustrated each group of wires has the same number of turns. In practice there are advantages in being able to adjust the number of turns as the particular situation dictates, so in other examples the winding pattern (and thus the pattern for apertures 102) may change dependent on the required flux pattern. The block may be wired with a single wire or with two wires in essentially opposite directions to reduce the common mode voltages inherent with such a large winding.

As shown in FIG. 1 there is continuous substrate or matrix (in this example concrete) in which the wire or wires are located. In the embodiment illustrated the matrix extends from the top surface of the pad to the bottom surface apart from the spaces where the wires are—these may take up to 50% of the area at that point, and any air space in the holes may be plugged using a material such as an epoxy or glue for example. This can produce a very strong roadway unit or module that will not delaminate. It is also the simplest pad to manufacture of all pad structures used in IPT systems to date. It essentially has only two parts—a matrix to carry the wire, and the wire itself. In the roadway application all that is required is a concrete block and a litz wire. Such a structure can be assembled in 15-20 minutes. The process is assisted if the litz wire is supplied terminated, to the correct length, and with a strong cover over the wires for the full length of the litz wire.

Figure 3:
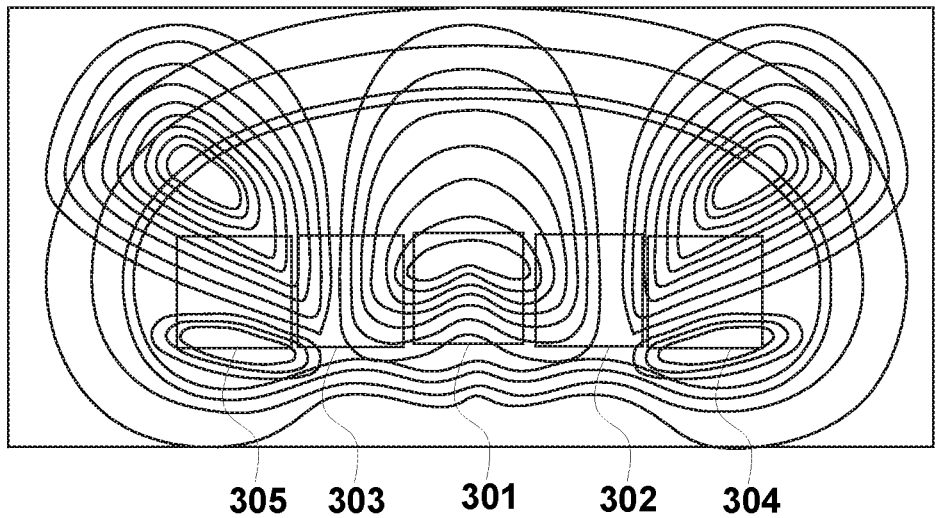
FIG. 3: is a 2D simulation of the flux pattern produced for the arrangement of FIG. 2.
Figure 4:
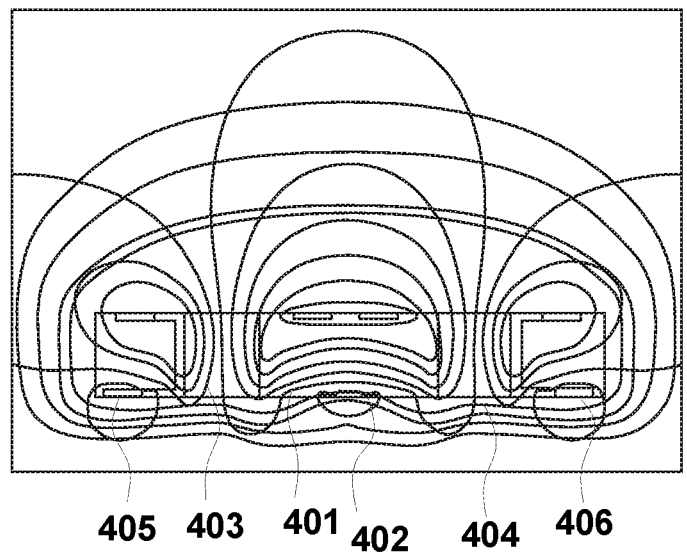
FIG. 4: is a 2D simulation of the flux pattern produced for the arrangement of FIG. 2 but with the central coil doubled in width.

FIGS. 3 and 4 show 2D field plots for pads made in this manner. FIG. 3 is a pad having five solenoidal coils 301-305 that achieves a good front to back ratio, in the ratio of the flux it produces out the top of the pad compared with the flux out the bottom of the pad. Here there are 16 turns per coil and all the coils have the same NI generation 25 A times 16 turns. Different results may be achieved by changing the numbers of turns for each coil. FIG. 4 shows the flux plot for a 6-coil pattern 401-406 where the centre coil is two coils 401 and 402 in series. The other details are that all the horizontal coils (four) have 12 turns, and the vertical coils (two) have 16 turns and all the wires have the same current so this pattern has exactly the same ampere turns as the pattern in FIG. 3: 4×12+2×16=80 turns: times 25 A. As can be seen, the patterns have the same height and about the same front to back ratio but the concrete in FIG. 4 is one "square" block longer so it is lower cost to install in terms of litz wire per meter of road—a reduction in cost of 20%. Other patterns may be made by changing the numbers of turns, as required, in the different square blocks.

Figure 5:
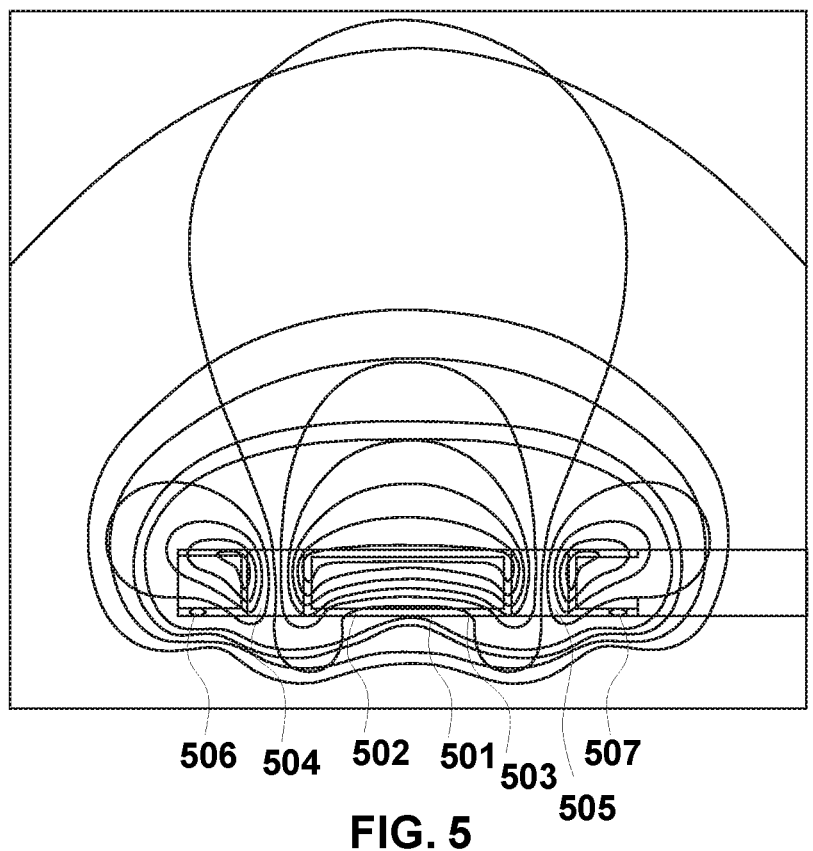
FIG. 5: is a 2D simulation and presentation for a conventional 5-square pick-up.

As another example, FIG. 5 shows an arrangement of seven coils 501-507 where the central 'coil' is three coils 501-503 i.e. three square blocks in series.

The pattern of FIG. 4 has another advantage in that it can be divided into 2 symmetrical halves, so for a number of pads are in a string 1 2 3 4 5 an alternate arrangement may be made using the second half of the first pad with the first half of the second pad to form another sequence of pads that is 90 degrees out of phase with the original sequence. Thus, if the pads are aligned to the direction of travel, then for a moving vehicle a sequence with smaller steps is possible. Expanding the sequence to show both halves of each pad the original sequence can be written 1, 1½, 2, 2½, 3, 3½ . . . where it is expected that two sequential pad halves are on together, so the sequence can be:
1, 1½ the first full pad on
1, 1½, 2 the first full pad on, plus half the second pad
1½, 2 the first half pad is fully off, the second pad is half on
1½, 2, 2½, the second half of pad 1 is on, and all of pad 2 is on
2, 2½ All of pad 1 is off, all of pad 2 is on An alternative description is to arbitrarily denote the poles with north and south qualities even though they are AC poles. Starting with block 1 with a north and a south pole the pattern is:

| | |
|---|---|
| N, S | Pad 1 |
| N, S, N | |
| _, S, N | Pad 1-2 |
| _, S, N, S | |
| _, _, N, S | Pad 2 |

And the pattern then continues from there with these small steps between transitions.

This half stepping produces a much more continuous power transfer mode than switching each of the pads fully on and off, at the time of switching. The difference is quite major—a step of 60 cm for a pad 1.2 m long as against a step of 1.2 meters. The pad under the car may now be significantly smaller with the new arrangement, and the fluctuation in power is likewise a lot smaller.

Figure 6A:
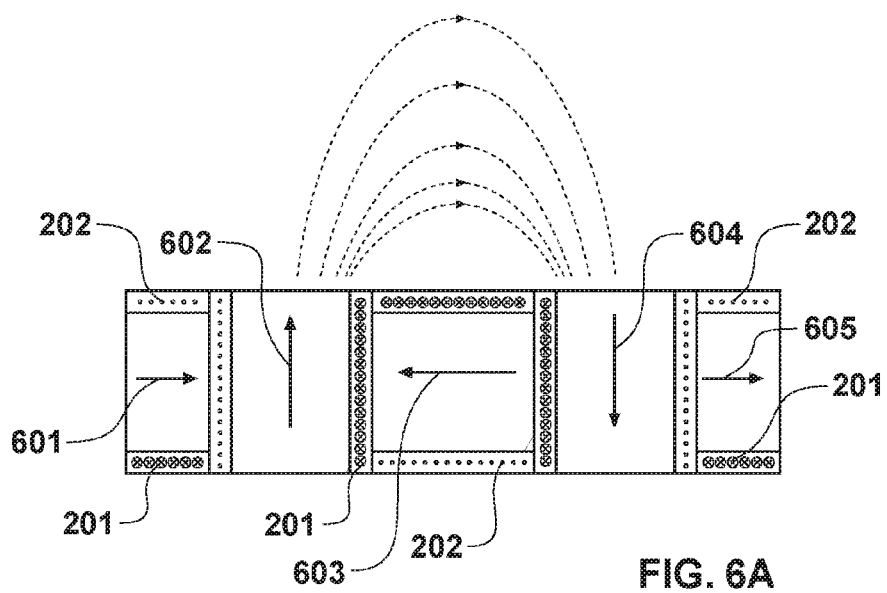
FIG. 6A: is a diagrammatic cross section through a pad arrangement similar to that shown in FIG. 2, but with the central coil tripled.
Figure 6B:
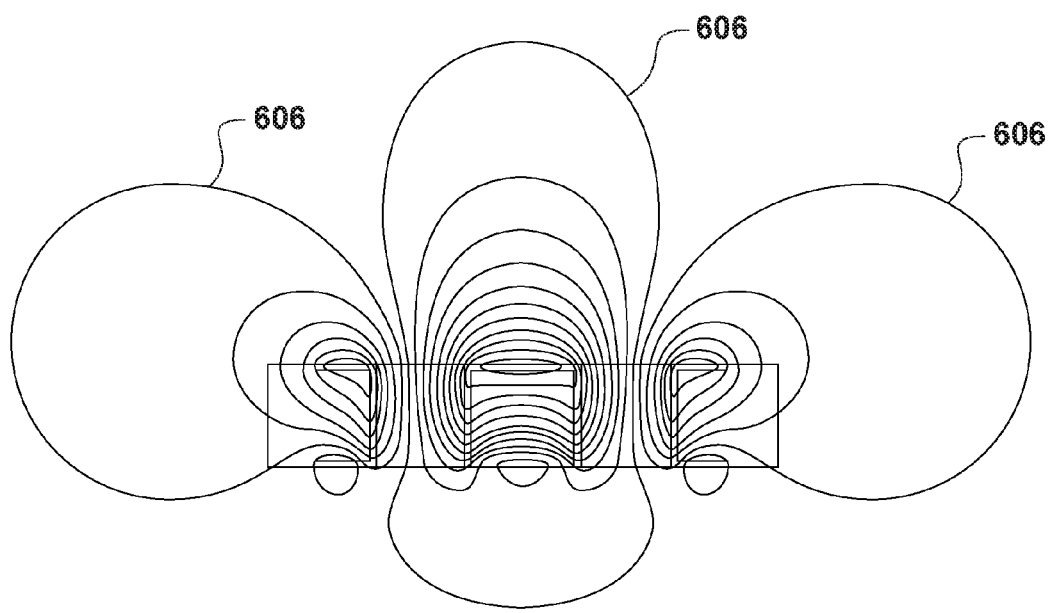
FIG. 6B: is a 2D simulation of the flux pattern produced for the arrangement of FIG. 6B.

An alternative presentation for 5-square pads is shown in FIGS. 6A and 6B. Here FIG. 6A shows the NI vectors 601-605 that drive the pads. FIG. 6B shows the flux lines 606 caused by them. The NI vectors are also shown in FIG. 2. These flux lines are interesting but give no indication of the field strength and indeed the highest flux lines correspond to very weak fields indeed. The colours or shading in FIGS. 3-5 do give an indicative field strength (T). However the presentation here is good for the NI vectors as their direction is immediately clear. Longer arrays are easy to make by extending the patterns as required with alternating poles and horizontal sections between them.

Figure 7:
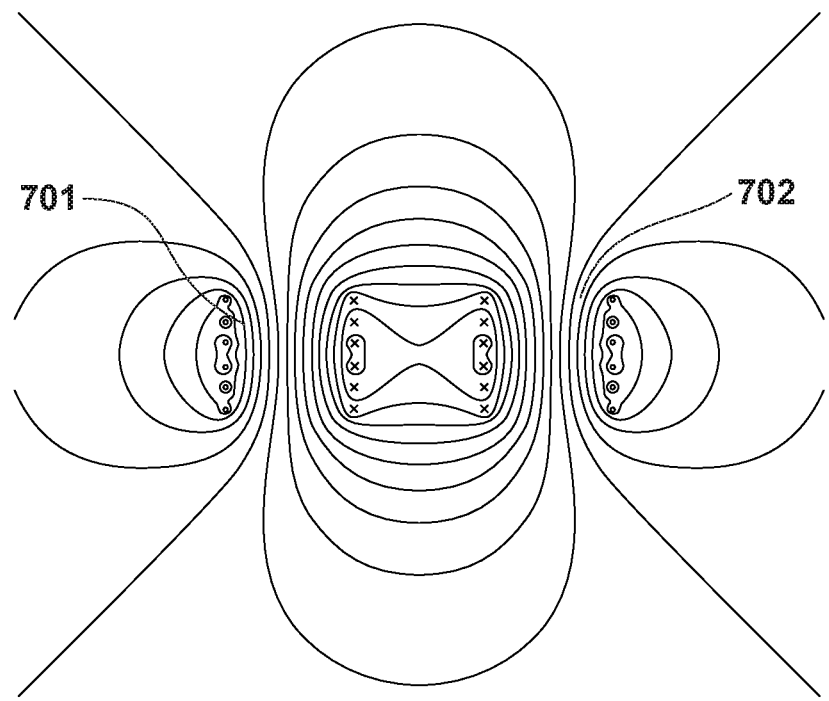
FIG. 7: is a 2D simulation of the flux paths from two identical vertical flux coils in close proximity but not touching.
Figure 8:
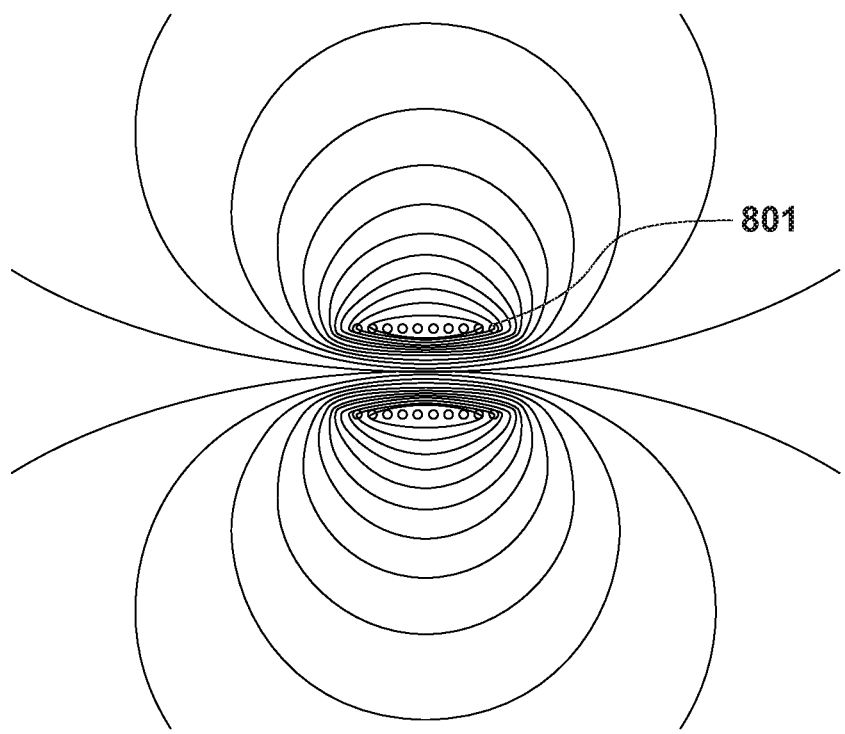
FIG. 8: is a 2D simulation of the flux plot for a horizontal flux coil.
Figure 9:
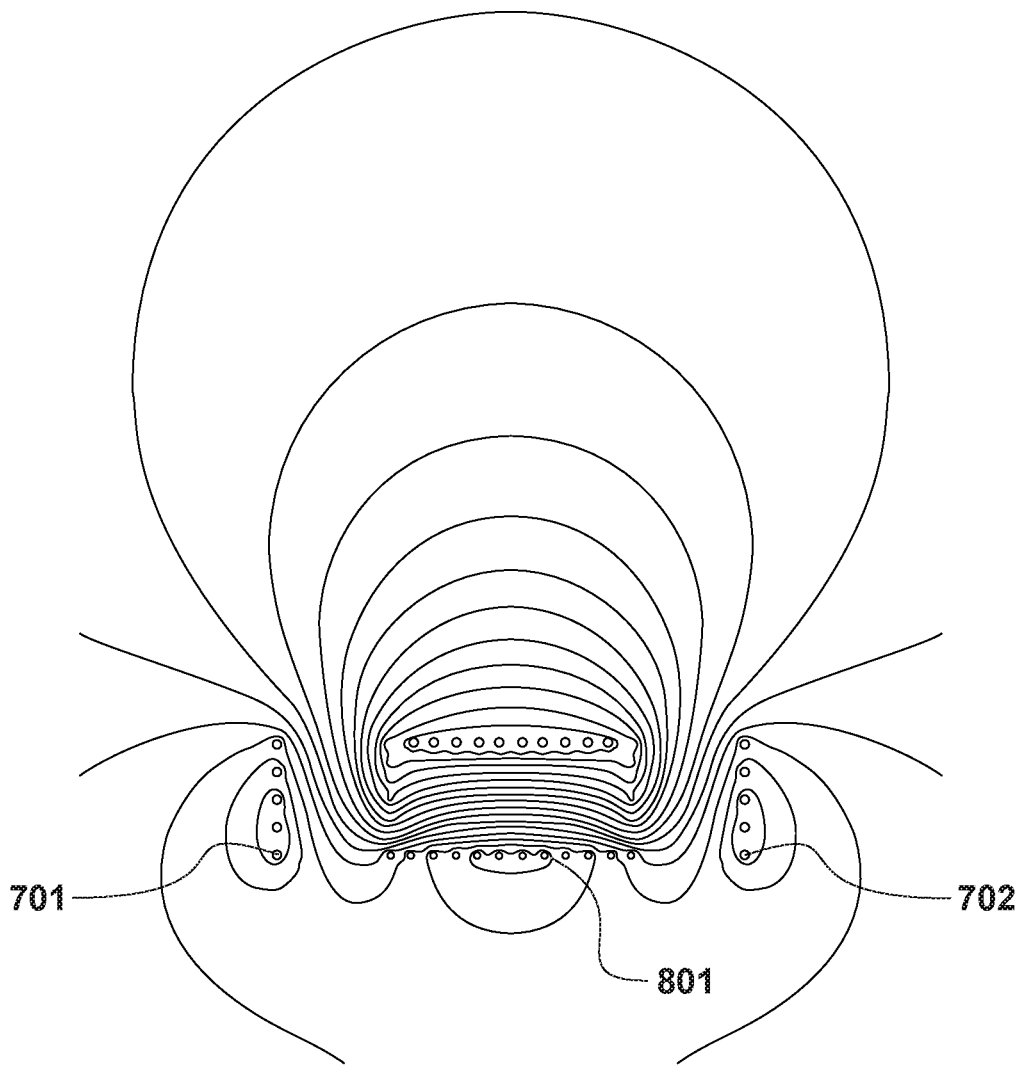
FIG. 9: is the flux pattern produced when the vertical coils in FIG. 7 are added to the horizontal coils in FIG. 8 with the correct polarity. The coils should have the same prismatic square shape to fit together properly. This is a 4-square pick-up coil where the central coil has twice the area of the outside coils.

An alternative understanding for these pick-ups using only four square cross section building blocks instead of five may be gained using FIGS. 7-9. FIG. 7 shows the flux pattern for two vertical flux coils 701-702 in close but not touching proximity. This pattern has four flux regions of interest—one out each side and the top and bottom fluxes. Of these only the flux out the top is of use for a single sided flux pattern and the others must be removed. Similarly FIG. 8 shows the flux pattern for a horizontal flux coil 801—there are two flux patterns one out the top and one out the bottom but again only one of these can be useful at any one time. But these flux patterns may be combined by placing the horizontal flux coils in the space between the two vertical coils. If the coils all have the same prismatic shapes and sizes it is easy to fit the coils together and with the correct polarity the flux pattern of FIG. 9 is obtained.

Therefore, the magnetic fields in the lower parts of FIGS. 7 and 8 in effect cancel to weaken or delete the resultant field extending from the bottom of the pad. In contrast, the fields in the upper parts of the structures shown in FIGS. 7 and 8 augment or reinforce each other, so a high arching magnetic flux can be produced form the upper surface of the pad. The end fields mix in a way that turns out to be quite beneficial to the performance of the pick-up. It is important not to overpower the horizontal pattern by using vertical fluxes that are too strong, or significant leakage flux may be produced. Thus the vertical ampere turns/meter should be less than the horizontal ampere turns per meter. As the pads are conveniently wound with a single wire this means that the turns on the vertical flux coils must be less than the coils on the horizontal flux coils. In most of our examples these are 5 turns and 12 turns respectively. The 2D flux plot is identical to previous pad designs with the end windings reduced to zero turns so it fits into the same family. Here this pad has a double square central section 320 mm×160 mm, and two vertical mmf sections 160 mm×160 mm. As shown in this example there are 5 turns in the end squares and 12 in the central section.

The flux plot shows a nearly constant flux through the central section, turning through essentially 90 degrees in each end section. The flux pattern is for the situation where the current in each wire is 23 A. As shown the flux pattern is high with little end flux and very little flux out the back (bottom) of the pick-up. This is a promising pick-up for roadway, and other, applications.

For analysis purposes for a roadway application each block in this pad or pick-up is essentially a square 160 mm on the side—with a double block in the centre. A rough estimate of the average flux path length in the pick-up is 480 mm. If the pad is 400 mm wide then the area of the average flux path is 0.16 m×0.4 m and therefore counting all 22 turns as shown the approximate inductance should be $$L = \frac{4\pi \cdot 10^{-7} \cdot 22^2 \cdot 0.16 \cdot 0.4}{0.48} = 81 \ \mu H$$

However the flux path must include the return path in air and if this path has essentially the same reluctance as the path through the coils then the estimated inductance will be halved to 40 μH. Clearly this is not an accurate calculation methodology but it gives inductance values within 10-20% of measured or simulated values. Here proper account has not been made for the ends (it is a 2D simulation) so there must be a considerable error. A laboratory prototype pick-up with these dimensions had a measured inductance of 50 μH.

This simple reluctance concept can be further developed. As shown the pad or pick-up here has an NI driving it of 22 turns×23 A and the space above the pad sees this NI less the NI drop in the pad. Similarly to the maximum power theorem in electrical circuits a maximum condition will exist here when the reluctance of the air-path matches the reluctance of the source. At this point the air-gap reluctance times the total magnetic flux in the air-gap, squared, will be a maximum—

$$R\phi^2 = \frac{l}{\mu A}\phi^2 = \frac{lA}{\mu}B^2 = \frac{B^2}{2\mu} 2 \cdot Volume$$

Now $$\frac{B^2}{2\mu}$$

is well known to be the magnetic energy density (J/m³) of a magnetic flux B so that multiplying it by twice the volume gives twice the energy in the space above the pad which is maximised if the reluctance of the air and the reluctance of the pad are equal. In the circumstances here this is therefore the condition for maximising the output of the IPT coupling and is highly desirable. Thus for a maximum energy in the air-gap the reluctances of the air and the pad should be approximately equal. These reluctances have the same length and the same permeability so the optimum condition is for them to have the same area. Thus for a given pick-up height the thickness of the pad is known. The pad here is 160 mm thick—it is ideal for a pick-up that is 160 mm above the ground.

This argument is not rigorous but is has been found to be a useful guide—if the pick-up has to work with an air-gap of 300 mm then the ground pad should be 300 mm thick. The simplicity of the calculation is very helpful—more accurate results may be achieved by computer simulation but even here they can be checked by this simple equality.

FIGS. 3, 4, and 5 show this equality. Here pick-ups are built up with different numbers of square blocks in different configurations but keeping the amp, turns per block the same. The useful flux height appears to be independent of these changes showing that only the thickness of the array or string is important. Here FIG. 3 uses 5 blocks, FIG. 4 uses 6 blocks, and FIG. 5 uses 7 blocks so that the variation here is quite significant with the central block being 1, 2, or 3, building blocks long but the flux height remains essentially the same.

As calculated the concrete pad has a higher internal reluctance than for example a DD pad which has virtually no internal reluctance at all—in essence the concrete pad acts more like a current source where the DD and other pads act like voltage sources. With a DD pad if extra flux paths are created the pad will fill them with flux. With a concrete pad the total flux is more constant and as extra paths are opened they do get flux in them but at the expense of existing flux paths. So in a practical case having a pick-up coil over the pad allows flux to go to the pick-up coil but the flux to other paths is reduced and in particular the leakage flux is reduced. This is a very important difference between the technologies as the reduction of leakage flux is an important factor in the uptake of the technology.

Figure 10:
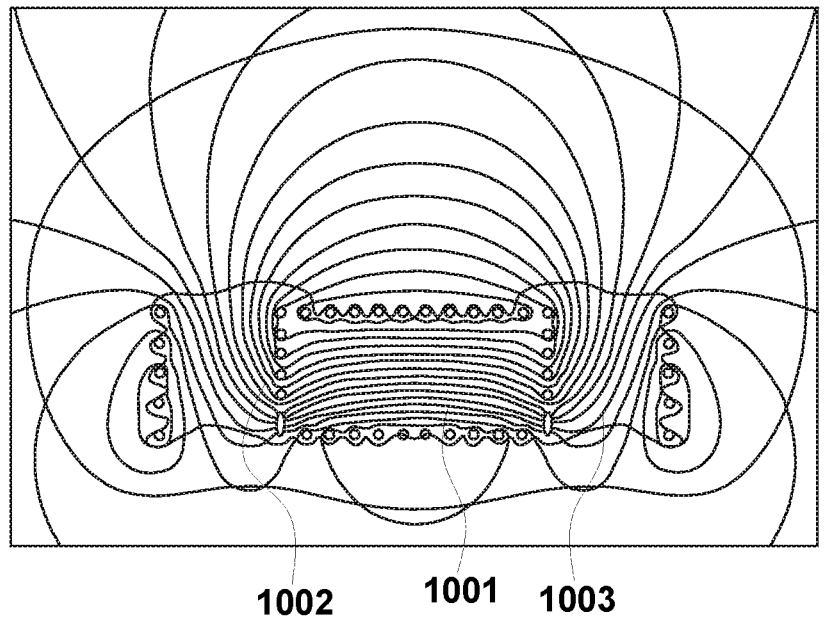
FIG. 10: is a 2D simulation of the flux pattern for a 4-square coil with no flux collector above it.
Figure 11:
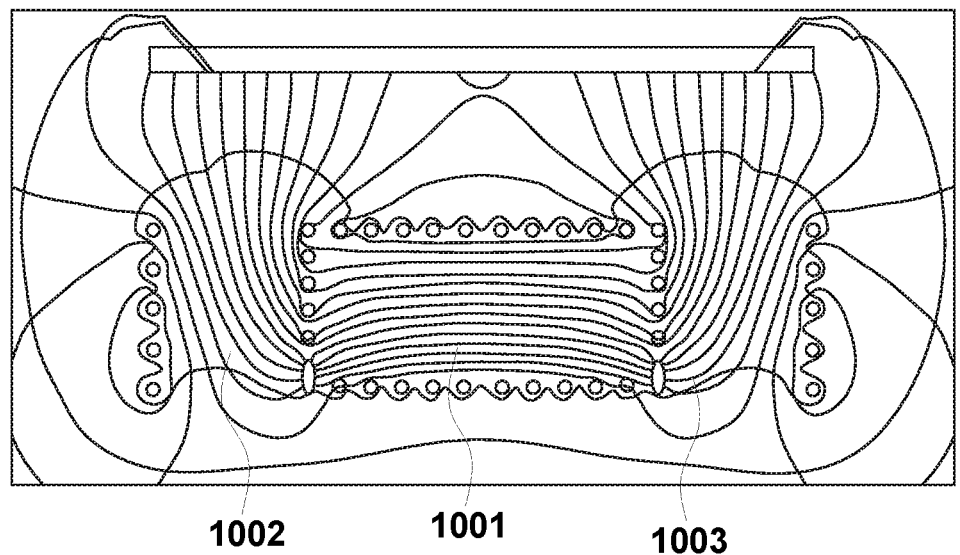
Figure 12:
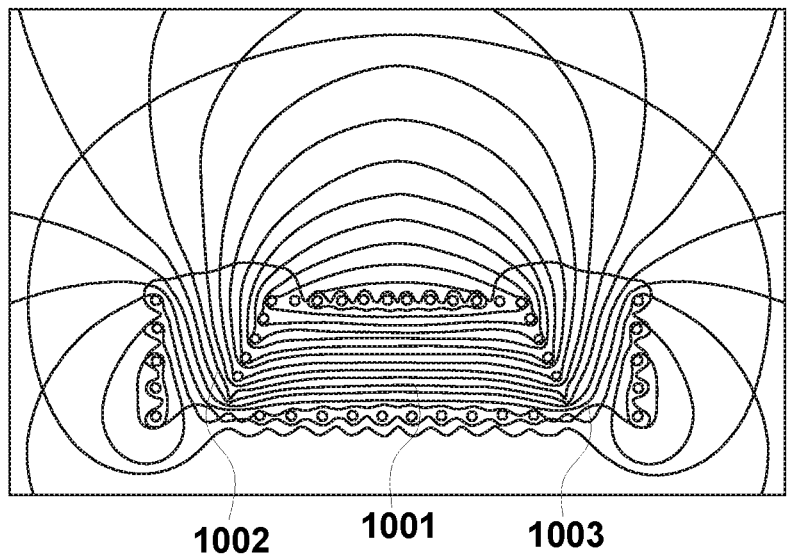
FIG. 12: is a 2D simulation as in FIG. 11 but with an angled transition between sections.
Figure 13:
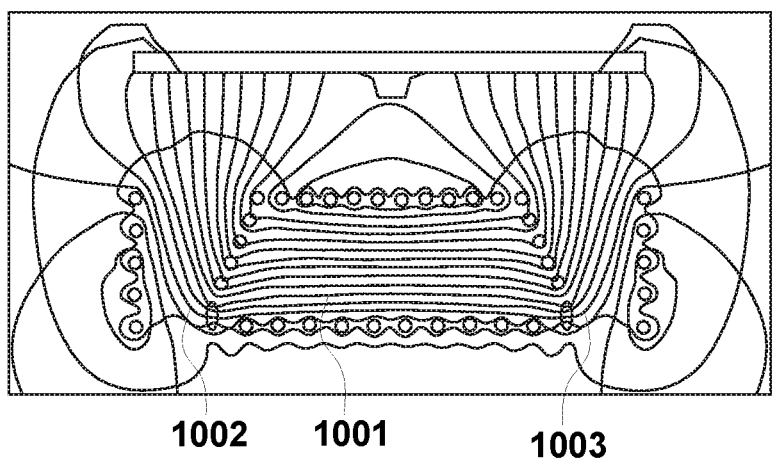
FIG. 13: is a simulation as in FIG. 12 but with an angled transition between sections.

The implementation of all these considerations is shown in FIGS. 10-13. FIG. 10 shows the winding pattern and the flux it produces for a 4 square pick-up (ie a pick-up without the end coils so that there is a central coil 1001, and coils 1002 and 1003). FIG. 11 shows the flux that is captured by this winding pattern using a simple ferrite strip collector. These flux patterns are essentially single sided but there is some flux out the back (bottom) of the flux generator. Thus there are two obverse surfaces (i.e. generally opposed surfaces) which may be defined by the coil dimensions. At one surface the fields produced by the coils augment each other. At the other surface they are substantially weakened. The surfaces do not necessarily need to be physical or continuous surfaces, as surfaces at which the desired field effects occur may be at various distances relative to the coil arrangement. Also, the apparatus may in some embodiments be provided as a simple arrangement of coils without defined surfaces or sides per se. Although the examples shown in the drawings generally show the obverse surfaces as flat, it will be appreciated that in some embodiments one or both surfaces may comprise a curve or other shape, and that the surfaces are not necessarily defined solely by the coils, and that the surfaces do not necessarily need to be parallel to each other. Furthermore, the relative dimensions of coils 1001, 1002, and 1003 may differ from those shown in the drawings Figures. For example, the end coils 1002 and 1003 may be higher than the thickness or depth of central coil 1001. Similarly, the thickness or depth of central coil 1001 may be greater than the height of ends coils 1002 and 1003. In some embodiments it may be advantageous for the end coils 1002 and 1003 to be of different dimensions. The ferrite strip collects virtually all of the flux at the top of the pick-up. FIGS. 12 and 13 show a slight modification where the transitions from the double square to the single squares are angled. This has very little effect on the top flux but the leakage flux out the bottom is substantially reduced as shown in FIGS. 12 and 13. Also as shown in FIG.

13 the flux collection using a single strip of ferrite is still very good. This reduction in leakage flux is a remarkable result which was not expected but improving the leakage like this is important so this variation is significant.

Figure 15:
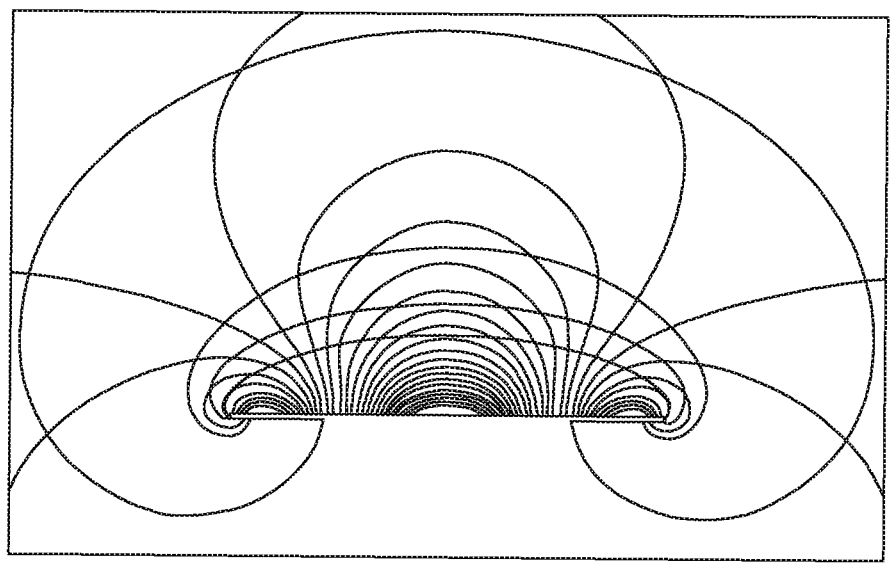

Continuing with the leakage flux differences FIG. 15, and FIGS. 12 and 13, show flux plots for DD and concrete pads respectively. In all the plots the flux lines can be divided into two categories: Potentially-linkage flux completes its path above the roadway surface and some of it can potentially link to a pick-up if a pick-up is present, while leakage flux completes its path below the roadway surface and can never link to a pick-up. There are other leakage flux paths that exist completely within the pad but these are not at issue here. For the leakage and potentially-linkage fluxes there is a clear demarcation between the two categories for both DD and concrete pads. With the DD pad the demarcation is at an angle of approximately 60 degrees to the horizontal. Above this angle all the flux is potentially-linkage flux while below it the flux is leakage flux and can cause problems. With the concrete pad the demarcation line is almost horizontal so that the leakage flux should pose less difficulty as for the most part it is underground. Note that the ground level with the concrete pad is at the level of the top of the winding pattern.

Coupling Factor

Figure 14:
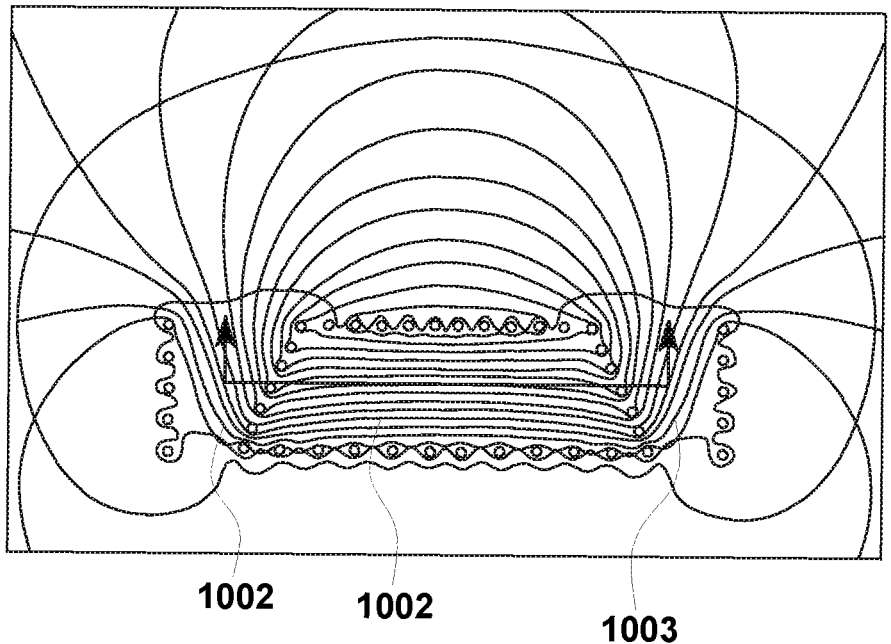
FIGS. 14 and 15: Show the similarity between DD and the new pad.

Notwithstanding the excellent flux patterns that have been achieved the coupling factor from a ground coil to a pick-up coil must be calculated. Here there are three inductances and the mutual coupling between them which are of importance. These are:

1. The 'body inductance' of the ground pad, called here $L_1$, which is the internal inductance in the ground pad between one pole face and the other pole face As shown in FIG. 14 the flux path may be approximated as a path of length/from one pole face to the other.
2. The inductance from the pole face into the space above the ground pad,
3. The inductance of the pick-up pad on the underside of the vehicle.

These last two inductances are impossible to calculate but they may be estimated with reasonable accuracy given experience with Double D pads. This is the method used here and while it is not necessarily accurate it does show that apparently low coupling factors must be expected with this form of pick-up coil.

The pad used here is a 4-square pad with a square size of 160 mm, and making some simplifications the inductance between the pole faces corresponds to a solenoidal coil with 22 turns, 480 mm long, and with an area of 160 mm×1000 mm for a 1 meter pad. So the inductance of this path length, $L_1$ is given by $$L_1 = \frac{\mu A N^2}{l} = \frac{4\pi 10^{-7} 160 \text{ mm} \cdot 1000 \text{ mm} \cdot 22^2}{480 \cdot \text{mm}} = 203 \text{ } \mu H/\text{metre}$$

The inductance of the flux paths above the pole faces, called here $L_2$, would be expected to be much the same as a DD pad and is perhaps 100 μH for a pad of this size and power rating, and the pad acting as the pick-up pad under a vehicle might also be a genuine DD pad $L_3$ with an inductance of 100 μH. A comparison of the flux pattern for a concrete pad as used here and a Double D pad is made by comparing FIG. 14 for a concrete pad with FIG. 15 for a similarly sized Double D pad where the similarity in the field shape is sufficient to justify this approximation for the value of $L_2$. (Note that the comparison is only for the flux above the top row of windings in the concrete pad (ie the airspace above the pad) as the other fluxes have already been included.) Now $L_1$ and $L_2$ have essentially the same flux through them and would be expected to be highly coupled with a coupling factor of perhaps 0.9. However $L_2$ and $L_3$ are not so highly coupled and from experience with DD pads may have a coupling factor of 0.4—this is in fact a very good coupling factor for a circuit of this type.

The observed inductance of the ground pad is the combination of $L_1$ and $L_2$.

$$L_P = L_1 + L_2 + 2k_{12} \cdot \sqrt{(L_1 L_2)} = 550 \text{ μH with the figures given.}$$

However the coupled voltage into the pick-up coil $V_{OC}$ only corresponds to the mutual inductance between $L_2$ and $L_3$ which with a coupling factor of $k_{23}$ is 40 μH so the apparent coupling factor linking $L_P$, and $L_3$ is given by $$k = \frac{k_{23}\sqrt{L_2 L_3}}{\sqrt{L_3(L_1 + L_2 + 2k_{12}\sqrt{L_1 L_2})}} = k_{23}\sqrt{\frac{L_2}{L_1 + L_2 + 2k_{12}\sqrt{L_1 L_2}}} = 0.17$$

Thus even though the coupling factors between individual coils and pick-ups are quite high they appear to be low in this particular circuit.

Figure 16:
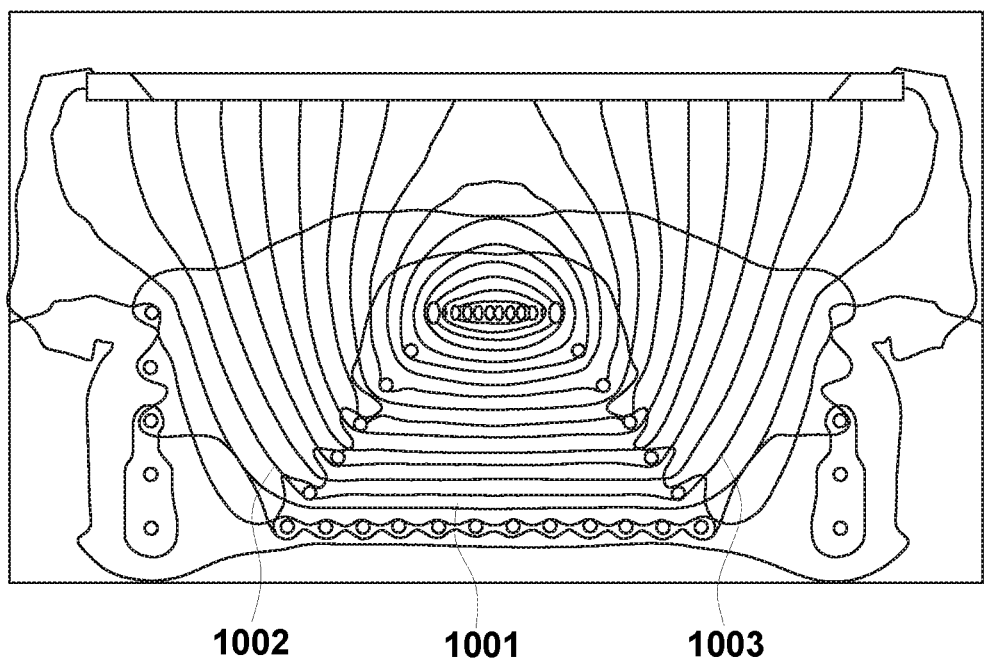
FIG. 16: Shows a preferred embodiment in 2D with all features, included.

FIGS. 11 13 and 16 show the operation of the pad with a strip of ferrite at the position where a ferrite based DD, DDQ, or Bipolar pad might be placed in a coupled condition. The concrete pad is not suitable for in-vehicle applications as it is too thick and too heavy but it is suitable for most other pad types especially DDQ and bipolar pads. The efficiency of the flux collection by the ferrite strip in FIGS. 11,13, and 16 is quite good. Note also that the non-coupled fluxes in this coupled condition are reduced as described above.

The low apparent coupling factor arises because of the large body inductance $L_1$ in the ground pad that is necessarily a part of the pick-up system. Even if all the coupling factors were a perfect 1.0 the apparent coupling factor would still be only 0.4 for this case. This $L_1$ inductance is essentially constant so that it can be compensated using a series capacitor. The use of a series capacitor here is not series tuning and while it does affect the observed operating Q for the pad, it also reduces the voltage required to drive it.

Variations

In the 4-square or 4-block pick-up system all the dimensions may be adjusted to suit particular applications. For example a pick-up where a 300 mm air-gap is required between the ground pad and the pick-up on the vehicle will in principle be 300 mm thick and have an angled transition from the end blocks to the 2-square central block. We have found that winding this pick-up with 5 turns on the outside blocks, and 12 on the middle block seems to give acceptable solutions. The outside blocks share one turn with the central block so the linear windings are 5, 7, 12, 7, and 5 and this pick-up is referred to as a 5-7-12 pick-up. The width and depth of the blocks may be varied still keeping these winding ratios—5, 7, 12. It is apparent that there can be a leakage flux on the outside of the 5-turn windings and with high excitation currents this can be a significant flux that is observable outside the ends of the pad. This leakage is apparent on FIG. 9 (very clearly) and FIGS. 10-14. where the leakage flux links parts of the 5-winding but does not travel to the top of the pad. This flux is principally underground but that issue notwithstanding it can be suppressed using a metal (copper) plate or screen to keep it (the flux) close to the 5-turn winding. The effect of this screen is a slight reduction in the pad inductance but this is so small that it cannot be observed externally. The metal plate is shown in FIG. 16 for a 300 mm deep pick-up with 100 A in the windings. In these circumstances the average current in the copper is the reflected current in the wires and is 500 A in 30 cm or 17 A/cm or 1.7 A/mm. Assuming a skin depth of 0.3 mm the resistance/mm is 0.06 Ohms/m so the watts loss is 170 mW/mm for each 1 m depth in the pad and for a 300 mm pad this gives a loss of 52 watts/m which is not negligible and as it occurs at both ends of the pad it is a 1% loss for a 1 m wide pad transferring 10 kW.

The square sizes here have also been adjusted to improve the performance—the pole pieces are slightly wider but the overall pick-up is smaller. A 4-square pick-up with 300 mm thickness would be expected to be 1200 mm wide and this pick-up is only 914 mm wide but the copper screen adds to the width as shown. Nonetheless the pick-up is still wound with a 5, 7, 12 winding and is the expected 300 mm thick. The copper screen may have horizontal slots in it to allow concrete to pass through it when the pad is being fabricated so that the concrete/copper bond does not de-laminate in service.

A preferred embodiment for a pad is shown in FIG. 16. Points to note are that the coupling height in the same as the pad depth. But the pad is narrower than usual to save space. The numbers of winding wires are clearly visible—5, 7, 12, 7, 5. The pick-up can be wound with one continuous piece of wire. The ampere turns in the end windings—5 turns—is less than the ampere turns in the horizontal windings—12 turns—so that the H fields produced are 25 turns per meter vertically and an average of 30 turns per meter horizontally so where the vertical and the horizontal fluxes meet the flux turns towards the body of the pick-up providing linkage and not leakage. This is an important feature of the pick-ups—for all systems including the original 4 block system the number of turns per meter in the vertical blocks (Blocks 1 and 4) should be the same or smaller than the number of turns per meter in the horizontal blocks (Blocks 2 and 3).

Figure 19:
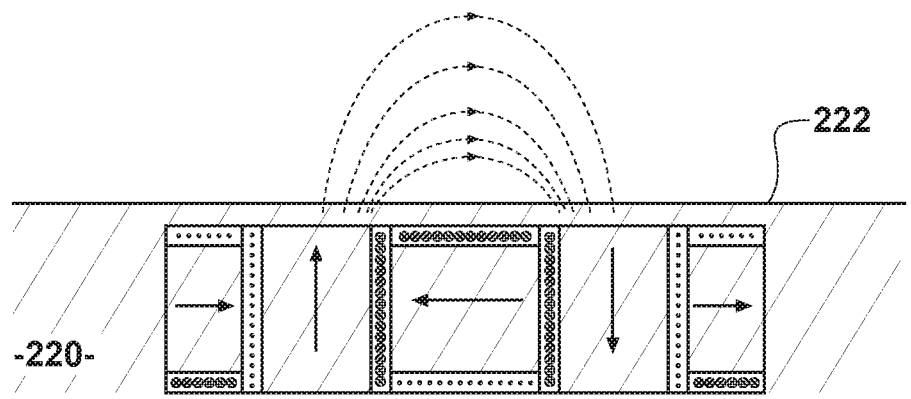
FIG. 19: is a diagrammatic elevation in cross section showing apparatus according, to the invention in a roadway.

As discussed above, apparatus according to the invention may be provided as a roadway unit for placement in a roadway, or be provided as part of a roadway. Thus, referring to FIG. 19, apparatus according to the embodiment of FIG. 6A is shown surrounded by a matrix 220 of roadway material (for example concrete) such that a first, or upper, surface of the apparatus is at or near the surface 222 of the roadway to make a useful magnetic field available above the surface 222. References to a roadway include roads, driveways, parking spaces, garage floors and the like.

A preferred construction technique for these pads is to wind them with a single piece of wire directly into a hole pattern as shown in FIG. 1. This same technique is also applicable to the structures in FIGS. 2-5 and 10 to 14 and 16. The windings could be threaded through a solid block but this would be difficult as the block would be very heavy and difficult to manage. Alternatively the wires could be threaded through a shell and after threading the shell can be filled with a solid material—for example concrete. After filling the whole assembly can be coated with concrete or epoxy to protect the end wires. The top surface of the assembly can also be coated with a thick layer of epoxy—or an epoxy/concrete mix—to give a strong durable surface to support heavy traffic passing over the pad if the traffic is not well aligned.

Nonetheless there is still a lot of wire to thread and it is a difficult process to automate.

Figure 20:
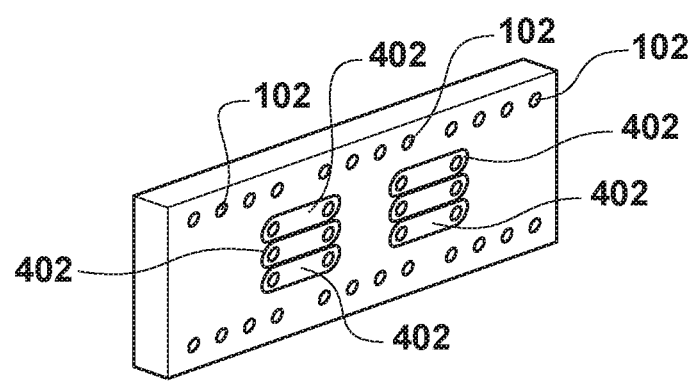
FIG. 20: is a diagrammatic isometric view of a side of a roadway unit in the form of a substrate having conductive paths.

A completely different construction technique can be envisaged from FIG. 1 and is shown by way of example with reference to FIG. 20. Here the faces containing the holes could be printed circuit boards. One circuit board is shown referenced 400, and tracks 402 on those printed circuit boards would be the connection from one hole to the next for the winding. The tracks 400 are illustrative only in FIG. 20. The tracks on the PCB can be multi-layer copper tracks to give a good high frequency performance. The through holes can now be threaded with copper or copper clad aluminium rods (not shown) and the assembly is completed by inserting the rods and flow soldering them at both ends. This is a simple technique that would allow a pick-up to be assembled in a few minutes and is relatively simple to automate.

Using litz wire a 4 mm diameter litz wire has a cross sectional copper area of 6.36 mm$^2$ and with insulation has a diameter approaching 6 mm. A 6 mm aluminium rod at 40 kHz has a skin depth of 0.41 mm and a useful cross sectional area of 0.41×the circumference=7.7 mm$^2$ so it is a useful connection technique even at 40 kHz giving a similar conduction area to litz wire. Aluminium is more resistive than copper but the larger area of aluminium reduces the gap between them. The PCB technique has the disadvantage of having a lot of connections that will increase the losses and lower the circuit Q but it could be a substantially lower cost.

The invention, when used as a magnetic flux production device for IPT applications can be used with pick-up structures including those disclosed in our international patent publications WO2010/090539 and WO2011/016737 the disclosures of which are both incorporated herein by reference.

Another embodiment of the invention is described with reference to FIGS. 17 and 18. Some lamp applications are not for lighting but for disinfection. Here for example the treatment of sewage by UV radiation is common but it is a particularly messy application where the changing of tubes is a task not willingly undertaken given the coating of sewage that may be covering both the lamp and its holder.

Here pad structures 1701 and 1702 employing concrete offer a solution. The walls of the sewer are lined with the concrete pads and magnetic fields 1704 produced by these pads induce voltages in the UV tubes 1705 (shown in FIG. 18) causing them to strike and disinfect the sewage. To do this the lamps must be in the form of a closed loop and must radiate at the correct frequency. By placing a significant number of these tubes in a concrete channel the sewage is forced to flow close to the tubes where the intensity is sufficient to kill all the unwanted organisms in it. A significant disinfection to 99.999% will be possible with lamps at the correct frequency and at the correct power.

These lamps are quite difficult to strike and keep going so the apparatus will have to operate at a high frequency—perhaps 5-600 kHz to generate voltages that are high enough. No ballast can be used as the lamps do not have terminals to connect to. The arrangement is shown in FIG. 17. Note that magnetic fields can be generated from both sides.

In this arrangement cleaning the tubes is easy: The tubes sit in a frame and the whole assembly is lifted out and dunked into hot caustic soda for a few minutes until it is clean. The tubes are preferably enclosed in quartz to make them more rugged. Note that quartz is very strong and is transparent to UV frequencies which glass is not. When the tubes are worn out the whole lot of them can be replaced without making any disconnections or connections—a completely clean task.

Inductive lamps are known and have lifetimes significantly longer than regular fluorescent lamps but combining them with a concrete pad is an original application with some significant novelty. Using magnetic fields from both sides of the channel will make the magnetic field more uniform and improve the consistency of the disinfection process.

Figure 17:
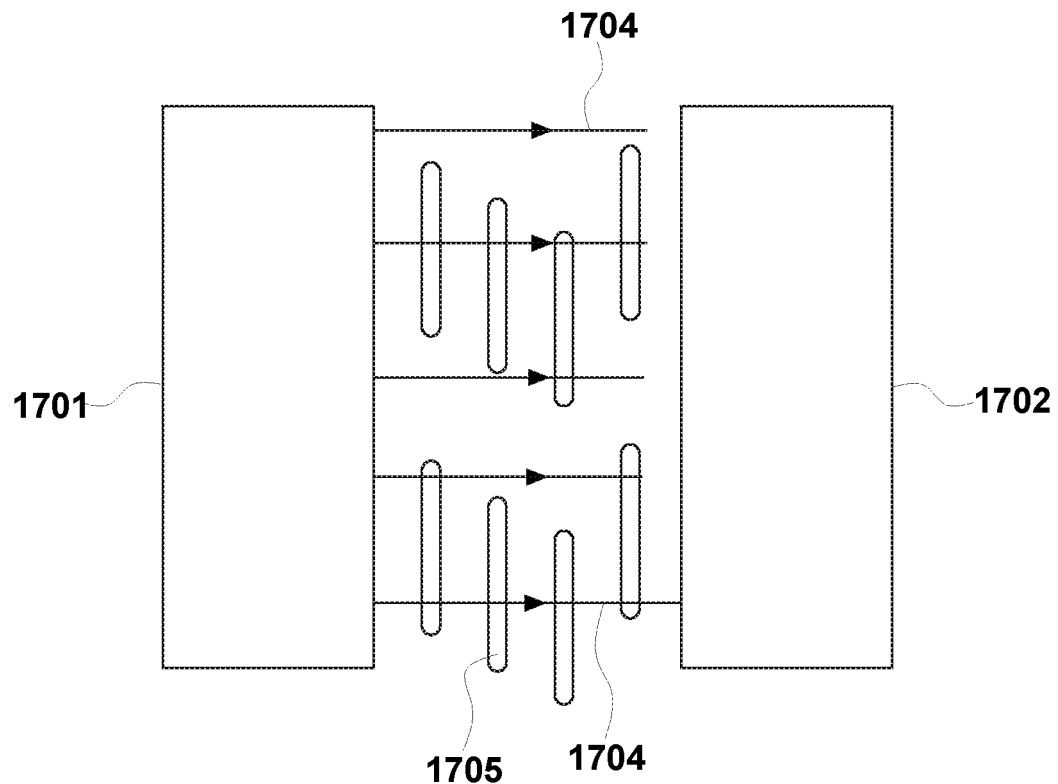
FIG. 17: is a diagrammatic plan view of a channel having apparatus according to the invention provided at either side of the channel.
Figure 18:
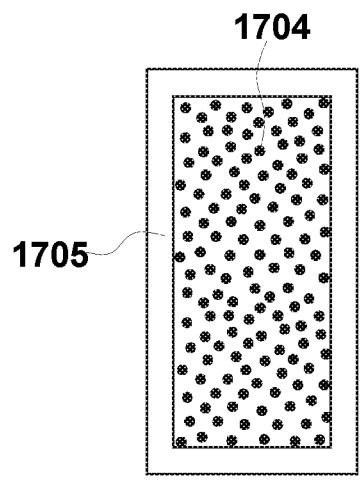
FIG. 18: is a diagrammatic side elevation of a UV light used in the channel of FIG. 17.

FIG. 17 shows how the system is created. A channel 40 cm wide has concrete pads 30 cm thick on each side creating a magnetic field. UV Tubes with a rectangular shape are vertically end-on in the channel. The magnetic field creates a strong induced voltage in the tubes causing them to strike and irradiate the sewage in the channel and disinfect it.

In another embodiment, the invention is provided in the form of a kitset.

In other embodiments, the apparatus includes resonant coils.

In other embodiments the invention provides three or more coils within a volume between an augmentation surface and a cancellation surface, wherein the coils are arranged relative to each other such that the mmfs from the coils augment at the augmentation surface and substantially weaken or cancel at the cancellation surface. The three or more coils may be arranged as two outer coils which, when energised, provide mmfs that are opposite to each other relative to each surface and one or more inner coils aligned relative to the outer coils so as to provide, when energised, an mmf between the outer coils to augment the mmf from the outer coils at the augmentation surface and to substantially weaken or cancel the mmfs from the outer coils at the cancellation surface.

In some embodiments the surfaces may be any surfaces defined on opposite sides of the apparatus.

In another embodiment, the pad structures disclosed herein may be used for other IPT applications, such as charging or powering domestic appliances. For example, rather then using concrete, a smaller version of a pad can be constructed using a flexible non-magnetic polymer such as a plastic or foam material that is the matrix within which the wire or wire are placed. This may occur by a moulding operation for example. The pad can be quite thin and is thus suitable for those applications where the pick-up can be located close to the pad. Thus in one example the pad may comprise a mouse-pad which powers and/or charges a mouse (having an appropriate pick-up) for use with a personal computer. Such a pad may also be used for charging other devices, for example cell phones, tablet computers, watches, calculators, toothbrushes etc. Other embodiments may be flexible so that they can be easily transportable, and larger versions can be used for charging or powering household appliances.

Where, in the foregoing description, reference has been made to specific components or integers of the invention having known equivalents then such equivalents are herein incorporated as if individually set forth.

Unless the context clearly requires otherwise, throughout the description and the claims, the words "comprise", "comprising", and the like, are to be construed in an inclusive sense as opposed to an exclusive or exhaustive sense, that is to say, in the sense of "including but not limited to".

Although this invention has been described by way of example and with reference to possible embodiments thereof, it is to be understood that modifications or improvements may be made thereto without departing from the scope or spirit of the invention as defined in the appended claims.

I claim:

1. Inductive power transfer apparatus suitable for producing a magnetic field for inductive power transfer, the apparatus comprising:
   three or more coils being provided between a first surface and a second surface, and being arranged such that when energized with a power source magnetic fields produced by each coil augment each other at the first surface and substantially weaken each other at the second surface relative to the first surface, wherein the first and second surfaces have an obverse relationship to each other.

2. Inductive power transfer apparatus as claimed in claim 1 wherein the coils comprise
   a central coil;
   a first end coil adjacent to one end of the central coil; and
   a second end coil adjacent to the other end of the central coil.

3. Inductive power transfer apparatus as claimed in claim 2 wherein the coils comprise solenoidal coils.

4. Inductive power transfer apparatus as claimed in claim 2 wherein the central coil produces a magnetomotive force (mmf) in a direction substantially parallel to the first surface, and the end coils produce mmfs in a direction substantially perpendicular to the first surface.

5. Inductive power transfer apparatus as claimed in claim 2 wherein the coils are arranged such that in use the fields produced by the end coils are in opposite directions such that a field is produced having an arched flux pattern beyond the first surface.

6. Inductive power transfer apparatus as claimed in claim 5 wherein a combined ampere-turns per meter of the end coils is less than a ampere-turns per meter of the central coil.

7. Inductive power transfer apparatus as claimed in claim 6 wherein the end coils have substantially the same ampere-turns, and the central coil has at least twice the ampere-turns of one of the end coils.

8. Inductive power transfer apparatus as claimed in claim 2 wherein a length of the end coils in a direction perpendicular to the first surface is substantially the same, and a length of the central coil in a direction parallel to the first surface is at least approximately twice that of each end coil.

9. Inductive power transfer apparatus as claimed in claim 8 wherein the ends coils share one or more turns with the central coil.

10. Inductive power transfer apparatus as claimed in claim 9 wherein the central coil has a greater length nearer the second surface than the first surface.

11. Inductive power transfer apparatus as claimed in claim 10 wherein the end coils have a greater circumference nearer the first surface than the second surface.

12. Inductive power transfer apparatus as claimed in claim 2 wherein a third end coil is provided adjacent to the first end coil, and a fourth end coil is provided adjacent to the second end coil.

13. Inductive power transfer apparatus as claimed in claim 12 wherein the third and fourth end coils are arranged to produce a magnetic field in a direction opposite to that of the first coil.

14. Inductive power transfer apparatus as claimed in claim 13 wherein the third and fourth end coils have less than or equal to half a number of ampere-turns of the first and second end coils.

15. Inductive power transfer apparatus as claimed in claim 2, wherein a distance between the first and second surfaces is defined by a dimension of the central coil.

16. Inductive power transfer apparatus as claimed in claim 15 wherein the magnetic field extends beyond the first surface to a distance approximately equal to the distance between the first and second surfaces.

17. Inductive power transfer apparatus as claimed in claim 1 wherein the magnetic field extends beyond the first surface to a distance approximately equal to a length of the first and second end coils in a direction perpendicular to the first surface.

18. Inductive power transfer apparatus as claimed in claim 1 wherein the coils are substantially surrounded by a substrate material.

19. Inductive power transfer apparatus as claimed in claim 18 wherein the coils are embedded in a substrate material.

20. Inductive power transfer apparatus as claimed in claim 19 wherein the substrate material comprises a non-magnetic material.

21. Inductive power transfer apparatus as claimed in claim 18 wherein the coils comprise one winding.

22. Inductive power transfer apparatus as claimed in claim 1 wherein at least one of the surfaces is a field effect surface.

23. Inductive power transfer apparatus suitable for providing a magnetic field for inductive power transfer, the apparatus comprising:
- a pair of first coil-sections separated about a first axis and arranged to produce a magnetic field in a direction substantially parallel to the first axis; and
- one or more second coil-sections arranged to produce a magnetic field extending substantially perpendicular to the first axis and aligned relative to the first coil-sections such that the fields diminish each other at a first end of the first axis.

24. Inductive power transfer apparatus as claimed in claim 23 wherein the fields reinforce each other at a second end of the first axis, the second end opposite from the first end.

25. A roadway inductive power transfer module suitable for producing a magnetic field for inductive power transfer to a vehicle using the roadway, the module comprising a road surface side and a road foundation side which is substantially opposite to the road surface side, a central coil, a first end coil adjacent to one end of the central coil and a second end coil adjacent to the other end of the central coil, the coils being arranged such that when energized with a power source magnetic fields produced by each coil diminish each other on the road foundation side.

26. A roadway inductive power transfer module as claimed in claim 25 wherein the coils are surrounded by concrete.

27. A roadway inductive power transfer module as claimed in claim 25 wherein the coils comprise one winding.

28. A roadway comprising a plurality of roadway inductive power transfer modules as claimed in claim 25.

29. Inductive power transfer apparatus as claimed in claim 25 wherein the fields reinforce each other at the road surface side.

30. Inductive power transfer apparatus suitable for receiving a magnetic field for inductive power transfer, the apparatus comprising:
- a first surface and a second surface in obverse relationship to each other; and
- three or more coils being provided between the first and second surfaces, and arranged such that when energized with a power source magnetic fields produced by each coil augment each other on the first surface and substantially weaken each other on the second surface relative to the first surface.

31. Inductive power transfer apparatus suitable for receiving a magnetic field for inductive power transfer of claim 30, wherein the three or more coils include:
- a central coil;
- a first end coil adjacent to one end of the central coil; and
- a second end coil adjacent to the other end of the central coil.

32. Inductive power transfer apparatus as claimed in claim 31 wherein the coils comprise solenoidal coils.

\* \* \* \* \*

UNITED STATES PATENT AND TRADEMARK OFFICE
CERTIFICATE OF CORRECTION

PATENT NO. : 9,406,436 B2
APPLICATION NO. : 14/354705
DATED : August 2, 2016
INVENTOR(S) : John Talbot Boys Page 1 of 1

It is certified that error appears in the above-identified patent and that said Letters Patent is hereby corrected as shown below:

On the Title Page

Item (71), in "Applicant", in Column 1, Line 2, before "Auckland", insert --Auckland City,--, therefor Item (72), in "Inventor", in Column 1, Line 1, after "Albany", insert --, Auckland--, therefor Item (73), in "Assignee", in Column 1, Line 2, before "Auckland", insert --Auckland City,--, therefor Item (57), in "Abstract", in Column 2, Line 4, delete "energized" and insert --energised--, therefor Signed and Sealed this
Twentieth Day of August, 2019

Andrei Iancu
*Director of the United States Patent and Trademark Office*